(12) United States Patent
Tomura et al.

(10) Patent No.: US 11,565,566 B2
(45) Date of Patent: Jan. 31, 2023

(54) VEHICLE HEIGHT ADJUSTING APPARATUS

(71) Applicant: HONDA MOTOR CO., LTD., Tokyo (JP)

(72) Inventors: Kineo Tomura, Tokyo (JP); Yosuke Wada, Tokyo (JP); Satoru Muto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 17/152,821

(22) Filed: Jan. 20, 2021

(65) Prior Publication Data

US 2021/0237529 A1    Aug. 5, 2021

(30) Foreign Application Priority Data

Feb. 3, 2020    (JP) .............................. JP2020-016394

(51) Int. Cl.
*B60G 17/02*    (2006.01)
*B62K 25/28*    (2006.01)
*B62K 25/04*    (2006.01)

(52) U.S. Cl.
CPC .............. *B60G 17/02* (2013.01); *B62K 25/28* (2013.01); *B60G 2300/12* (2013.01); *B62K 2025/044* (2013.01)

(58) Field of Classification Search
CPC ................ B60G 17/02; B60G 2300/12; B60G 17/0182; B62K 2025/044; B62K 2025/45
USPC .......................................................... 701/37
See application file for complete search history.

(56) References Cited

U.S. PATENT DOCUMENTS

| 5,211,420 | A  | * | 5/1993  | Iwashita .............. | B62K 25/08 |
|           |    |   |         |                        | 280/5.513  |
| 2012/0274043 | A1 | * | 11/2012 | Lee ..................... | B62K 19/36 |
|           |    |   |         |                        | 280/288.4  |
| 2015/0375823 | A1 | * | 12/2015 | Fioravanzo ........... | B62K 25/04 |
|           |    |   |         |                        | 701/38     |
| 2021/0237827 | A1 | * | 8/2021  | Tomura ................. | G08G 1/166 |

FOREIGN PATENT DOCUMENTS

| CN | 204915920  | U  | * | 12/2015 |
| DE | 102019006320 | B3 | * | 10/2020 |
| JP | 2002037158 | A  | * | 2/2002  |

(Continued)

OTHER PUBLICATIONS

Japanese Office Action for Japanese Patent Application No. 2020-016394 dated Nov. 2, 2021.

*Primary Examiner* — Paul N Dickson
*Assistant Examiner* — Caitlin Anne Miller
(74) *Attorney, Agent, or Firm* — Amin, Turocy & Watson, LLP

(57) ABSTRACT

A vehicle height adjusting apparatus according to one aspect includes: a vehicle height adjusting member that adjusts height of a seat of a saddle-type vehicle, using hydraulic pressure; an oil supplying portion that supplies oil to the vehicle height adjusting member, using a motor; and a control section that estimates a load applied to the vehicle height adjusting member, from a current supplied to the motor and a stroke correspondence quantity of the vehicle height adjusting member, and controls the oil supplying portion based on the load to adjust the height of the seat.

6 Claims, 5 Drawing Sheets

(56) References Cited

FOREIGN PATENT DOCUMENTS

| | | | |
|---|---|---|---|
| JP | 2003-072661 | | 3/2003 |
| JP | 2009-001151 | | 1/2009 |
| JP | 2014148205 A | * | 8/2014 |
| JP | 2016141163 A | * | 8/2016 |
| JP | 6491112 | | 3/2019 |

* cited by examiner

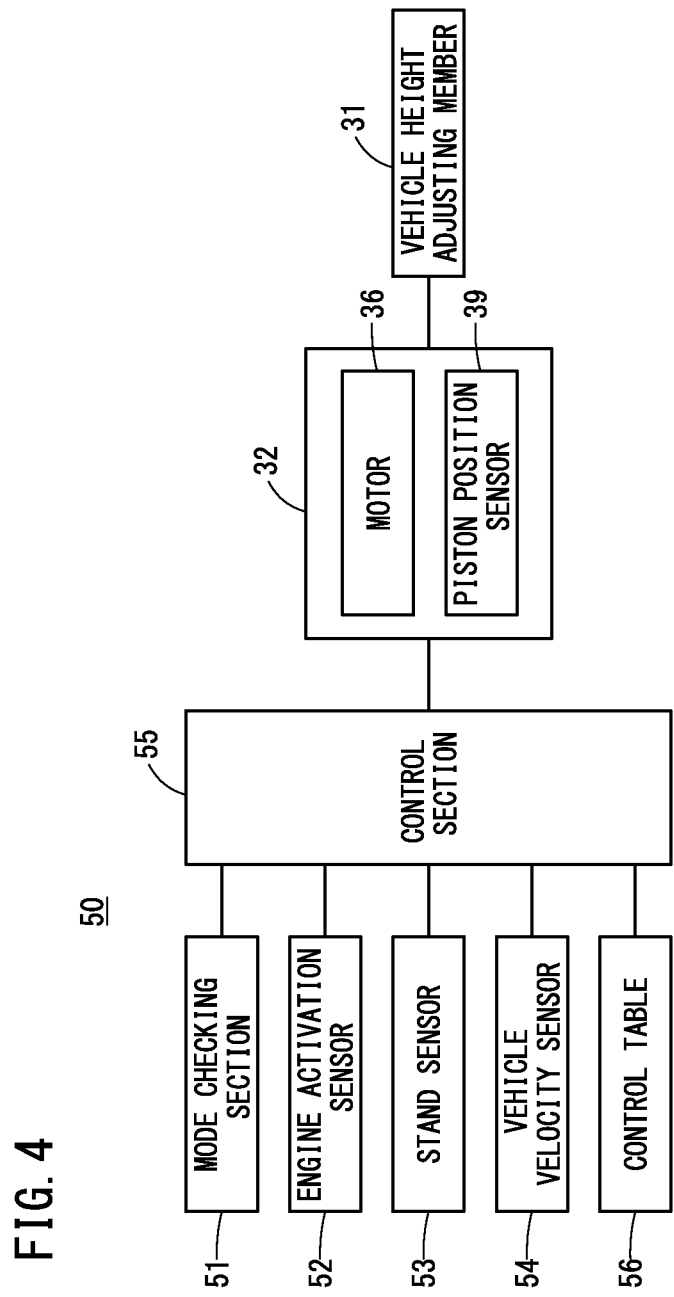

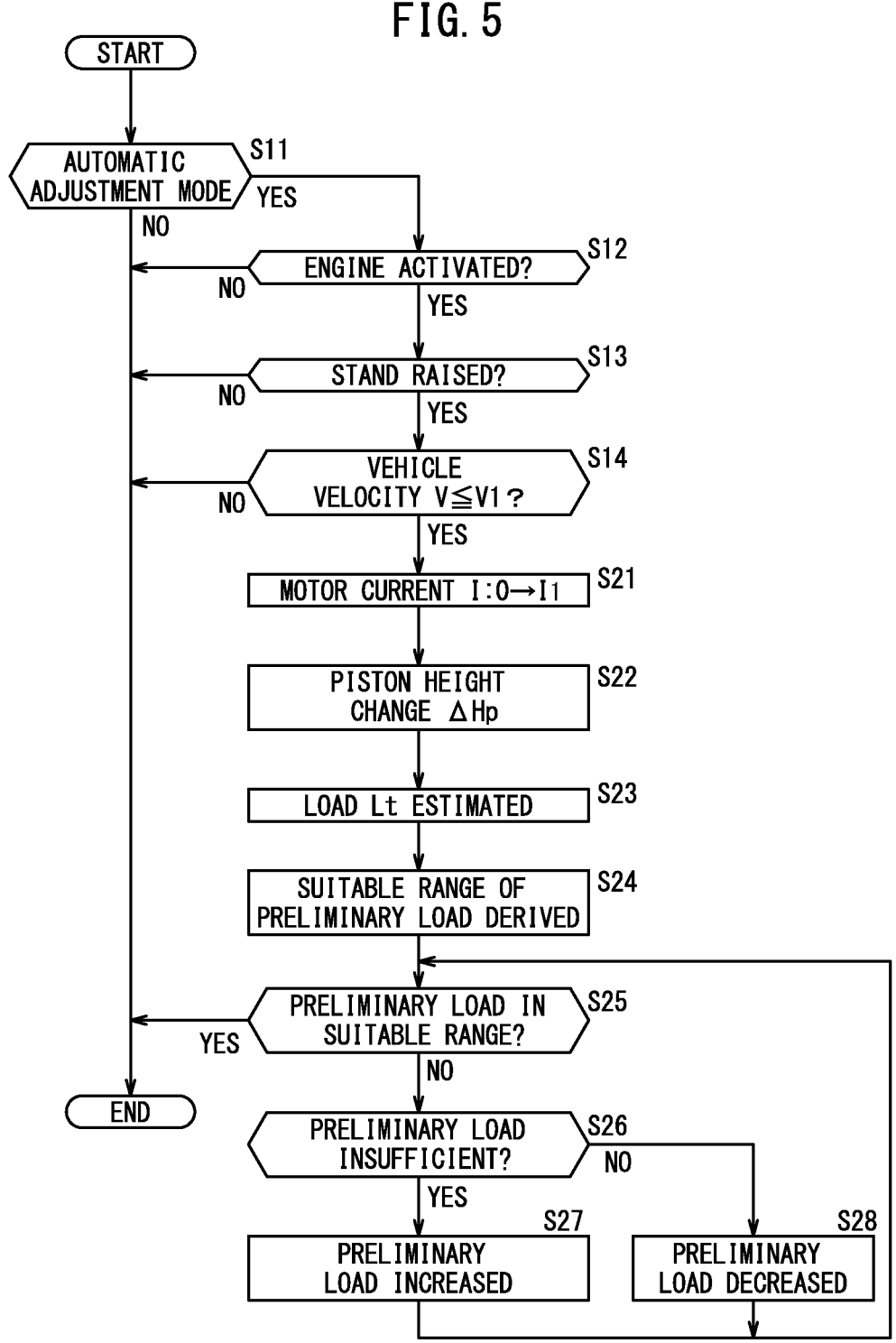

VEHICLE HEIGHT ADJUSTING APPARATUS

CROSS-REFERENCE TO RELATED APPLICATION

This application is based upon and claims the benefit of priority from Japanese Patent Application No. 2020-016394 filed on Feb. 3, 2020, the contents of which are incorporated herein by reference.

BACKGROUND OF THE INVENTION

Field of the Invention

The present invention relates to a vehicle height adjusting apparatus that adjusts the height of a vehicle.

Description of the Related Art

A vehicle height adjusting apparatus that sets the height of a vehicle within a suitable range is used (for example, see Japanese Patent No. 6491112). In general, a vehicle includes a suspension for absorbing impact on uneven road surfaces. Accordingly, when the load applied to the suspension increases, the suspension contracts and lowers the vehicle height. Therefore, the load is measured and the vehicle height is adjusted to be in a suitable range such that the vehicle height does not differ significantly due to the magnitude of the load.

SUMMARY OF THE INVENTION

However, when a load sensor is added to measure the load, the configuration of the apparatus becomes complicated. It is an objective of the present invention to provide a vehicle height adjusting apparatus that eliminates the need for measuring the load itself.

A vehicle height adjusting apparatus according to one aspect includes a vehicle height adjusting member configured to adjust height of a seat of a saddle-type vehicle, using hydraulic pressure; an oil supplying portion configured to supply oil to the vehicle height adjusting member, using a motor; and a control section configured to estimate a load applied to the vehicle height adjusting member, from a current supplied to the motor and a stroke correspondence quantity of the vehicle height adjusting member, and control the oil supplying portion based on the load to adjust the height of the seat.

According to the present invention, it is possible to provide a vehicle height adjusting apparatus that eliminates the need for measuring the load itself.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing a configuration of a vehicle height adjusting apparatus;
and
FIG. 5 is a flow chart showing an example of an operational procedure of the vehicle height adjusting apparatus.

DESCRIPTION OF THE PREFERRED EMBODIMENTS

Figure 1:
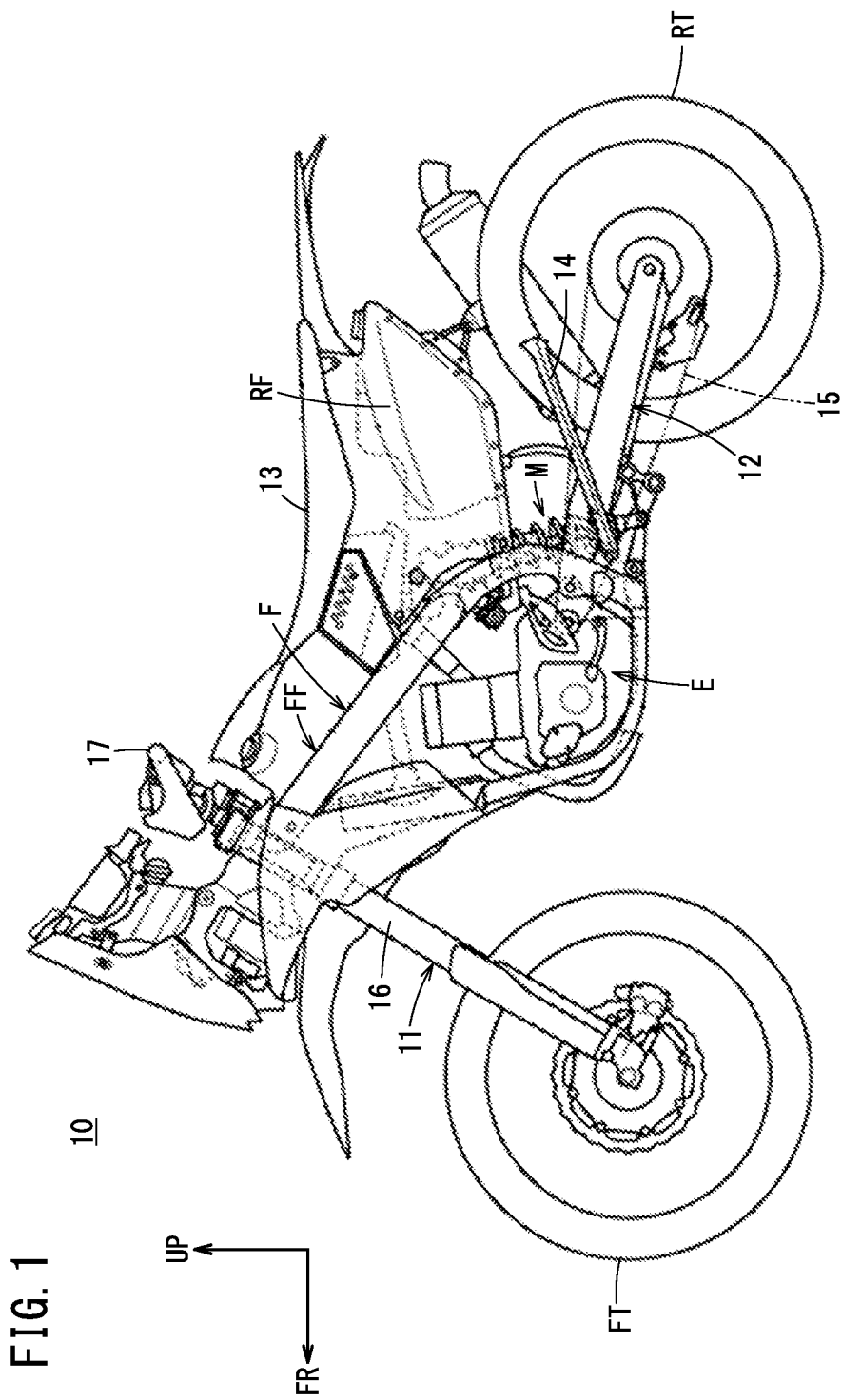
FIG. 1 is a left-side view of a motorcycle according to an embodiment.

The following describes a vehicle height adjusting apparatus according to an embodiment, with reference to the accompanying drawings. FIG. 1 is a left-side view of a motorcycle 10 according to an embodiment. In FIG. 1, among components that form left-right pairs, only the left-side components are shown, and the right-side components are not shown in the drawings. In the drawings, "FR" represents forward and "UP" represents upward.

The motorcycle 10 is a saddle-type vehicle in which the driver sits in a straddling manner, and includes a vehicle frame F (front frame FF and rear frame RF), an engine E, a steering system 11, a swinging arm 12, a seat 13, and a stand 14.

The engine E is supported by the vehicle frame F, and drives a rear wheel RT. The output of the engine E is transmitted to the rear wheel RT by a chain 15.

The steering system 11 is arranged at a front end of the front frame FF, and includes a pair of front forks 16 and a handle 17. The handle 17 is arranged at the top ends of the front forks 16, and a front wheel FT is arranged at the bottom ends of the front forks 16.

The swinging arm 12 is arranged on a rear side of the vehicle frame F, and supports the rear wheel RT. The seat 13 is arranged on a top portion of the rear frame RF, and is sat on by the driver.

A suspension mechanism M, which attenuates swinging of the swinging arm 12, is arranged between the swinging arm 12 and the vehicle frame F. The suspension mechanism M extends and contracts in an axial direction in accordance with up-down swinging of the swinging arm 12, to absorb impacts from the road surface.

Figure 2:
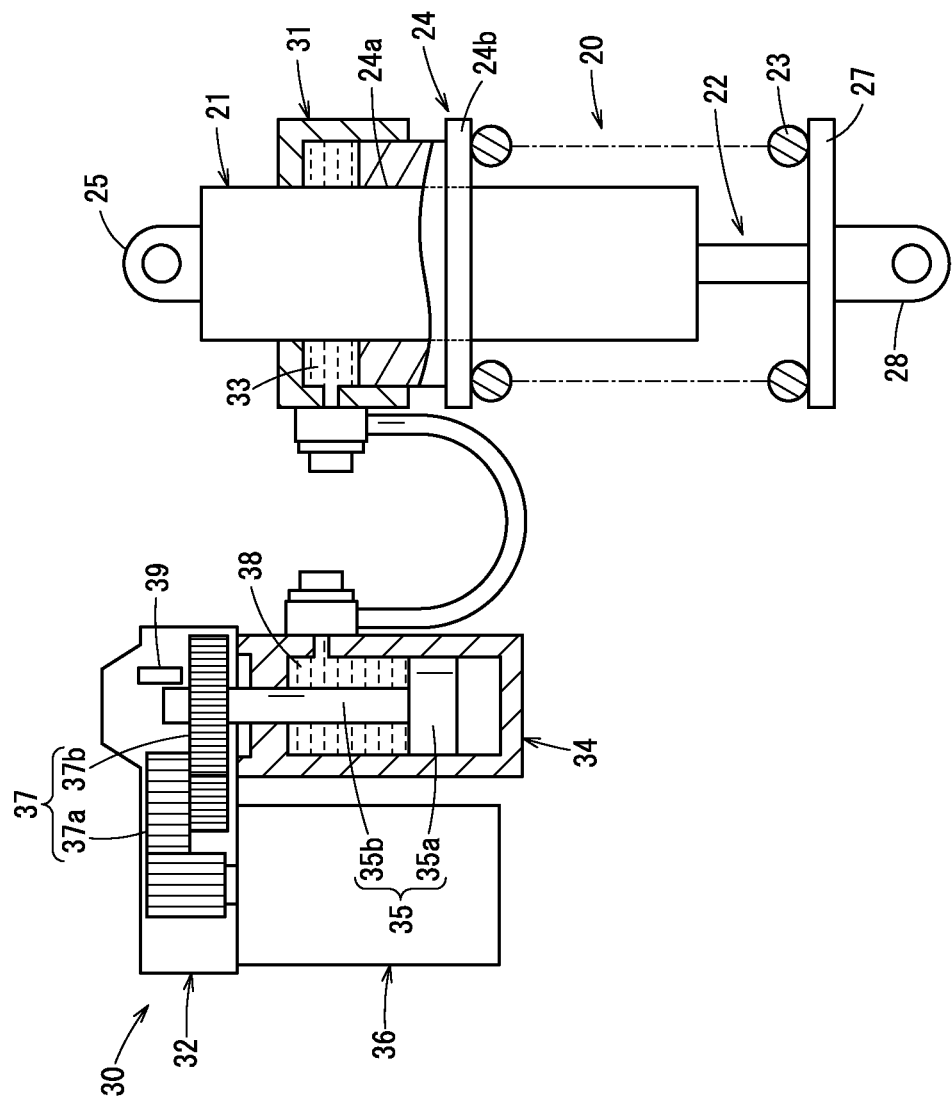
FIG. 2 is a diagram showing details of a suspension mechanism.

FIG. 2 is a diagram showing the details of the suspension mechanism M. As shown in FIG. 2, the suspension mechanism M includes a suspension 20 and a vehicle height adjusting mechanism 30.

The suspension 20 includes a suspension cylinder 21, a piston member 22, and a coil spring 23. The suspension cylinder 21 includes a cylinder-side receiving member 24 (cylindrical portion 24a and spring receiving portion 24b) and a body-side connecting portion 25. The piston member 22 includes a piston-side receiving member 27 and a wheel-side connecting portion 28.

The body-side connecting portion 25 of the suspension cylinder 21 is connected to the front frame FF, and the wheel-side connecting portion 28 of the piston member 22 is connected to the swinging arm 12. The inside of the suspension cylinder 21 is filled with hydraulic oil, and the piston member 22 is capable of sliding up and down.

The coil spring 23 is arranged in a compressed state between the spring receiving portion 24b of the cylinder-side receiving member 24 and the piston-side receiving member 27 of the piston member 22, and biases the piston member 22 in the extension and contraction direction of the suspension 20.

The cylinder-side receiving member 24 is capable of moving up and down relative to the suspension cylinder 21. That is, the cylindrical portion 24a of the cylinder-side receiving member 24 slidably engages with the outer circumference of the suspension cylinder 21. As shown below, the cylinder-side receiving member 24 is pressed by the vehicle height adjusting mechanism 30 (particularly a vehicle height adjusting member 31) to move up and down.

The vehicle height adjusting mechanism 30 is used to adjust the vehicle height and the initial load of the suspension 20, and includes the vehicle height adjusting member 31 and an oil supplying portion 32.

The vehicle height adjusting member 31 presses the cylinder-side receiving member 24 using hydraulic pressure (meaning fluid pressure in which the medium is not limited to oil), and adjusts the height of the seat 13. The vehicle height adjusting member 31 has a bottomed cylinder shape, and is fixed to the suspension cylinder 21. An oil chamber 33 is formed around the vehicle height adjusting member 31 and the suspension cylinder 21.

The oil supplying portion 32 includes a cylinder 34, a piston 35 (a piston body 35a and a shaft portion 35b), a motor 36 (an actuator and an electric motor), a transmission mechanism 37 (gears 37a and 37b), a hydraulic chamber 38, and a piston position sensor 39, and supplies oil to the vehicle height adjusting member 31.

The piston body 35a is capable of moving and rotating along the shaft of the cylinder 34, and is connected to the transmission mechanism 37 via the shaft portion 35b. A male screw, which is screwed into a through-hole (female screw) of the gear 37b, is formed in the outer circumference of the shaft portion 35b.

The rotation of the motor 36 is converted into linear motion via the transmission mechanism 37, and causes the piston 35 to move up and down. The gear 37a is rotated by the motor 36, and the gear 37b is also rotated by the motor 36. When the gear 37b rotates, the shaft portion 35b (piston 35) engaged with the gear 37b moves in the axial direction of the cylinder 34.

The piston position sensor 39 measures a position (height $H_p$) of the piston 35 relative to the cylinder 34, based on the protrusion amount of the shaft portion 35b from the gear 37b.

When the height $H_p$ of the piston 35 changes, an oil amount A in the hydraulic chamber 38 changes, and an oil amount A in the oil chamber 33 increases or decreases by a corresponding amount, thereby changing the vehicle height H. As shown below, by measuring the change of the height $H_p$ of the piston 35 with the piston position sensor 39, it is possible to obtain a change $\Delta A$ of the oil amount A in the oil chamber 33.

A change $\Delta H_p$ of the height $H_p$ of the piston 35 and the change $\Delta A$ of the oil amount A in the oil chamber 33 (oil amount A supplied to the vehicle height adjusting member 31) are shown by Expression 1 below.

$$\Delta A = S1 \cdot \Delta H_p \qquad \text{Expression 1:}$$

S1: floor surface area of the hydraulic chamber 38

A change $\Delta H$ of the vehicle height H and a change $\Delta L_p$ of a preliminary load $L_p$ at this time are shown by Expressions 2 and 3 below.

$$\Delta H = (S1/S2) \cdot \Delta H_p \qquad \text{Expression 2:}$$

$$\Delta L_p = k \cdot \Delta H \qquad \text{Expression 3:}$$

S2: floor surface area of the oil chamber 33
k: spring constant of the coil spring 23

The motor 36 is driven by a current I. This current I changes according to the change $\Delta H_p$ of the height $H_p$ of the piston 35 and a load Lt of the motorcycle 10 (the total weight of the motorcycle 10 itself, the driver, and baggage). Therefore, by obtaining the change $\Delta H_p$ of the height $H_p$ of the piston 35 occurring when the current I is changed from 0 to a prescribed value Is (or the magnitude of the current I when the height $H_p$ of the piston 35 is changed by a prescribed value $\Delta H_{ps}$), it is possible to estimate the load Lt.

Figure 3:
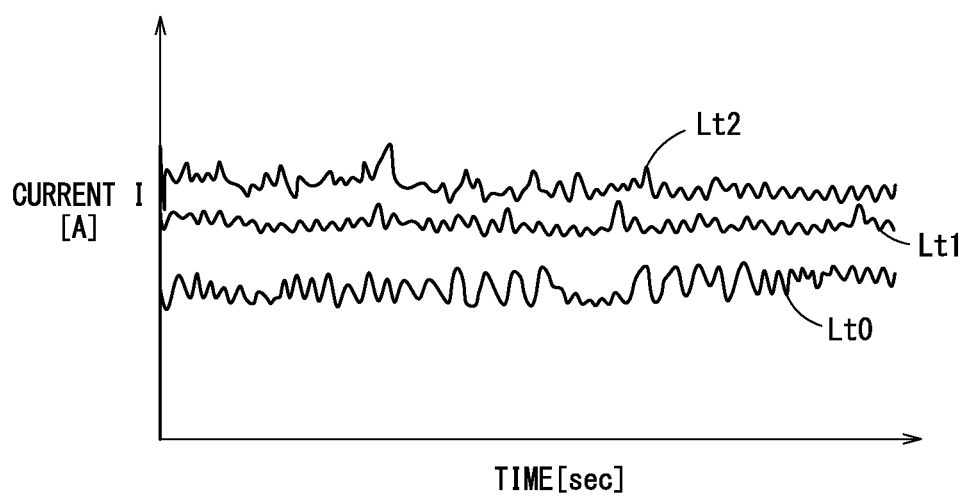
FIG. 3 is a diagram showing an example of a relationship between the current of a motor and a load.

FIG. 3 is a diagram showing an example of the relationship between the current I of the motor 36 and the load Lt. The current I of the motor 36 becomes stable after a certain amount of time has passed, but the stabilized current I depends on the load Lt. Specifically, the current I becomes greater as the load Lt becomes greater. Here, loads Lt0, Lt1, and Lt2 correspond respectively to a state where there is only the motorcycle 10, a state where there is one rider, and a state where there are two riders. The current I of the motor 36 becomes greater as the load Lt becomes greater in this manner, and the load Lt can be estimated using this relationship.

The vehicle height adjusting mechanism 30 changes the oil amount A inside the oil chamber 33 of the vehicle height adjusting member 31 by driving the piston 35 with the rotation of the motor 36, thereby adjusting the initial load applied to the suspension 20. Due to forward and reverse rotation of the motor 36, the piston 35 raises and lowers and oil is supplied to the oil chamber 33 from the hydraulic chamber 38 and discharged from the oil chamber 33, such that the oil amount A within the oil chamber 33 (initial load of the suspension 20) increases and decreases. The increase and decrease of the oil amount A in the oil chamber 33 also means an increase and decrease of the vehicle height H (height of the seat 13 relative to the road surface). In other words, the vehicle height adjusting mechanism 30 has both a function to adjust the initial load of the suspension 20 and a function to adjust the vehicle height H.

FIG. 4 shows a configuration of a vehicle height adjusting apparatus 50 that adjusts the vehicle height H of the motorcycle 10. As shown in FIG. 4, the vehicle height adjusting apparatus 50 includes a mode checking section 51, an engine activation sensor 52, a stand sensor 53, a vehicle velocity sensor 54, a control section 55, a control table 56, the oil supplying portion 32 (motor 36 and piston position sensor 39), and the vehicle height adjusting member 31.

As already explained, the oil supplying portion 32 includes the motor 36 and the piston position sensor 39, and supplies oil to the vehicle height adjusting member 31. The vehicle height adjusting member 31 adjusts the height of the seat 13 of the motorcycle 10, using the oil supplied from the oil supplying portion 32.

The mode checking section 51 checks whether the vehicle height adjustment of the motorcycle 10 is in an automatic mode or a manual mode. In the automatic mode, the vehicle height adjusting apparatus 50 automatically measures the load Lt without any sign from the driver, and adjusts the preliminary load $L_p$ (vehicle height H) in accordance with the load Lt.

The engine activation sensor 52 detects whether the engine E is activated. The stand sensor 53 is a switch, for example, and detects whether the stand 14 is raised.

The vehicle velocity sensor 54 measures the rotational velocity of the front wheel FT or the rear wheel RT and converts this rotational velocity into the movement velocity of the motorcycle 10 (vehicle velocity V), for example.

The control section 55 estimates the load Lt applied to the vehicle height adjusting member 31, from the current I supplied to the motor 36 and the oil amount A supplied to the vehicle height adjusting member 31, and controls the oil supplying portion 32 based on this load Lt to adjust the height of the seat 13. The details of this are described further below. The control section 55 can be formed by a combination of hardware (e.g. a CPU: Central Processing Unit) and software (e.g. a program).

The control table 56 is a storage section (e.g. a memory) that stores a piston height—load table T1, a current—load table T2, and a load—preliminary load table T3.

The piston height—load table T1 shows the correspondence between the height Hp of the piston 35 and the load Lt. The current—load table T2 shows the correspondence between the current I driving the motor 36 and the load Lt. The piston height—load table T1 is used to estimate the load Lt based on the change ΔHp of the height Hp of the piston 35 when the current I is changed from 0 to the prescribed value Is. The current—load table T2 is used to estimate the load Lt based on the magnitude of the current I when the height Hp of the piston 35 is changed by the prescribed value ΔHps. The control table 56 only needs to include one of the piston height—load table T1 and the current—load table T2, and does not need to include both.

The load—preliminary load table T3 shows a suitable range Rp of the preliminary load Lp corresponding to the load Lt. Generally, when the load Lt increases, the coil spring 23 of the suspension 20 contracts and the vehicle height H becomes lower. The load—preliminary load table T3 is set in a manner to reduce the dependency of the vehicle height H on the load Lt. Usually, the load—preliminary load table T3 is set such that the preliminary load Lp increases (ultimately causing the oil amount A supplied to the oil chamber 33 to increase) as the load Lt becomes greater.

The following describes the details of the operation of the vehicle height adjusting apparatus 50. FIG. 5 is a flow chart showing the details of the operational procedure of the vehicle height adjusting apparatus 50.

When the automatic adjustment mode is in use (step S11, YES), the engine E is activated (step S12, YES), the stand 14 is raised (step S13, YES), and the vehicle velocity V is less than or equal to a threshold value V1 (step S14, YES), the control section 55 estimates the load Lt in the following manner. The mode checking section 51, the engine activation sensor 52, the stand sensor 53, and the vehicle velocity sensor 54 are respectively used to make the judgments in steps S11 to S14. The threshold value V1 is 5 [km/hour], for example.

The procedure for estimating the load Lt is as follows. The control section 55 changes the current driving the motor 36 from 0 to a prescribed amount I0 (step S21). The prescribed amount I0 at this time is 5 [A], for example.

At this time, the control section 55 measures an initial height Hp0 of the piston 35 and a height Hp1 when the current is the prescribed amount I0, using the piston position sensor 39, and calculates the change ΔHp of the height Hp (=Hp1−Hp0) (step S22). As already explained, the change ΔHp of the height Hp corresponds to the change ΔA of the oil amount A supplied to the vehicle height adjusting member 31 and the change ΔLp of the preliminary load Lp.

The control section 55 references the piston height—load table T1 to estimate the load Lt corresponding to the change ΔHp of the height of the piston 35 (step S23).

After this, the control section 55 references the load—preliminary load table T3 to obtain the suitable range RP of the preliminary load Lp (suitable range Ra of the oil amount A in the oil chamber 33) corresponding to the load Lt (step S24).

The control section 55 converts the height Hp1 of the piston 35 occurring when the current is the prescribed amount I0 into a preliminary load Lp1, using Expression 3, and judges whether this preliminary load Lp1 is within the suitable range Rp (step S25).

If the preliminary load Lp1 is below the suitable range Rp ("YES" of step S26, a case where the preliminary load Lp is insufficient), the control section 55 drives the motor 36 to supply oil to the oil chamber 33, thereby increasing the preliminary load Lp (step S27). If the preliminary load Lp1 is above the suitable range Rp ("NO" of step S26, a case where the preliminary load Lp is excessive), the control section 55 drives the motor 36 to discharge oil from the oil chamber 33, thereby decreasing the preliminary load Lp (step S28). This process continues until the preliminary load Lp falls within the suitable range Rp.

As a result, a suitable preliminary load Lp corresponding to the load Lt is applied to the suspension 20, and the vehicle height H is adjusted to a suitable range, such that the vehicle height H does not differ greatly due to the magnitude of the load Lt.

As described above, by estimating the load Lt without directly measuring the load Lt itself, there is no need for a load sensor (or a stroke sensor, angle sensor, or the like for sensing the vehicle posture), and it becomes possible to perform the load estimation and vehicle height adjustment using the vehicle height adjusting mechanism 30.

In the above description, the current driving the motor 36 is changed from 0 to the prescribed amount I0, and the load Lt is estimated using the change ΔHp of the height Hp of the piston 35 occurring at this time. Instead, the height Hp of the piston 35 may be changed by the prescribed value ΔHps, the current I needed at this time may be measured, and the load Lt may be estimated using this current I.

In this case, at step S21, the control section 55 increases the current I supplied to the motor 36 until the height Hp of the piston 35 changes by the prescribed value ΔHps, and at step S22, the control section 55 reads the magnitude of the current I at this time. Then, at step S23, the control section 55 references the current—load table T2 to obtain the load Lt corresponding to the current I. In consideration of precision, the current I at this time is preferably not an instantaneous value, and is instead an average value over a certain time (e.g. 100 ms to 500 ms).

Here, the load Lt is estimated when the state of the motorcycle 10 is stable. That is, the load Lt is estimated when the engine E is activated, the stand 14 is raised, and the vehicle velocity V is less than or equal to the threshold value V1. Instead, the estimation of the load Lt and the adjustment of the vehicle height H may be performed when the vehicle velocity V exceeds the threshold value V1.

For example, if the following condition is satisfied, the estimation of the load Lt and the adjustment of the vehicle height H may be performed even when the vehicle velocity V is greater than or equal to a threshold value V2. The threshold value V2 is a value that is greater than the threshold value V1, such as a value of 10 [km/hour], for example. It is assumed that the engine E is activated and the stand 14 is raised.

This condition is, for example, that a state in which a bank angle θ of the motorcycle 10 is less than or equal to a prescribed value θ1 (e.g. 3°) and acceleration α of the motorcycle 10 is less than or equal to a prescribed value α1 (e.g. 2 m/sec²) continues for a predetermined time. If the state in which the bank angle θ and the acceleration α remain within a certain narrow range continues for a certain time, the travelling state of the motorcycle 10 is stable, and the estimation of the load Lt and the adjustment of the vehicle height H can be performed. The bank angle θ and the acceleration α can be measured respectively by a bank sensor and an acceleration sensor attached to the motorcycle 10.

The procedure for the estimation of the load Lt and the adjustment of the vehicle height H at this time can be performed in the same manner as steps S21 to S28 described above.

In the above description, the height Hp of the piston 35 is detected and the load Lt is estimated using this height Hp. However, the load Lt may be estimated using a quantity other than this height Hp. Specifically, the change of the height Hp of the piston 35 corresponds to the oil amount A supplied to the oil chamber 33, and further to the displacement of the cylinder-side receiving member 24 (spring receiving portion 24b) relative to the suspension cylinder 21 (vehicle height adjusting member 31).

Ultimately, it is possible to estimate the load Lt using any quantity, as long as this is a quantity (stroke correspondence quantity) corresponding to the change of the displacement of the cylinder-side receiving member 24 relative to the vehicle height adjusting member 31 (stroke amount of the vehicle height adjusting member 31). The stroke correspondence quantity can be measured as needed or calculated from another parameter (e.g. the height Hp of the piston 35). That is, instead of the height Hp of the piston 35 or the oil amount A supplied to the oil chamber 33, a stroke correspondence quantity (general quantity corresponding to the stroke of the vehicle height adjusting member 31) can be used as a broad concept.

Inventions such as described below can be understood from a collection of the embodiment and modifications described above.

[1] A vehicle height adjusting apparatus (50) according to the present embodiment comprises a vehicle height adjusting member (31) that adjusts height of a seat (13) of a saddle-type vehicle (10), using hydraulic pressure; an oil supplying portion (32) that supplies oil to the vehicle height adjusting member (31), using a motor (36); and a control section (55) that estimates a load (Lt) applied to the vehicle height adjusting member (31), from a current (I) supplied to the motor (36) and a stroke correspondence quantity of the vehicle height adjusting member (31), and controls the oil supplying portion (32) based on the load (Lt) to adjust the height of the seat (13).

Due to this, the load (Lt) applied to the vehicle height adjusting member (31) can be estimated from a current (I) supplied to the motor (36) and a stroke correspondence quantity of the vehicle height adjusting member (31), and the oil supplying portion (32) can be controlled based on this load (Lt) to adjust the height of the seat (13). As a result, even without a sensor that directly measures the load (Lt) itself, it is possible to estimate the load (Lt) and adjust the height of the seat (13).

[2] The control section (55) estimates the load (Lt) based on a change amount of the stroke correspondence quantity occurring when the supplied current (I) is changed by a prescribed amount. Due to this, it is possible to estimate the load (Lt) based on the change of the stroke correspondence quantity.

[3] The control section (55) estimates the load (Lt) based on a change amount of the supplied current (I) occurring when the stroke correspondence quantity is changed by a prescribed amount. Due to this, it is possible to estimate the load (Lt) based on the change of the supplied current (I).

[4] The control section (55) increases the stroke correspondence quantity as the estimated load (Lt) becomes greater. Due to this, it is possible to suppress the tendency of the vehicle height to decrease as the load (Lt) becomes greater.

[5] The saddle-type vehicle (10) includes a stand (14) and an engine (E), and the control section (55) estimates the load (Lt) when the stand (14) is raised and the engine (E) is activated. Due to this, the load (Lt) can be estimated while the saddle-type vehicle (10) is travelling.

[6] The control section (55) estimates the load (Lt) when a vehicle velocity (V) of the saddle-type vehicle (10) is less than or equal to a first threshold value (V1). Due to this, the load (Lt) can be estimated while the saddle-type vehicle (10) is travelling stably at a relatively low speed.

[7] In a case where a vehicle velocity (V) of the saddle-type vehicle (10) is greater than a first threshold value (V1), the control section (55) estimates the load (Lt) if a state in which a bank angle (θ) of the saddle-type vehicle (10) is less than or equal to a prescribed value (θ1) and acceleration (a) of the saddle-type vehicle (10) is less than or equal to a prescribed value (a1) continues for a prescribed time. Due to this, the load (Lt) can be estimated while the saddle-type vehicle (10) is travelling stably even at a relatively high speed.

The vehicle height adjusting apparatus according to the present invention is not limited to the above-described embodiments, and various configurations could be adopted therein without departing from the scope of the present invention.

What is claimed is:

1. A vehicle height adjusting apparatus, comprising:
   a vehicle height adjusting member configured to adjust height of a seat of a saddle-type vehicle, using hydraulic pressure;
   an oil supplying portion configured to supply oil to the vehicle height adjusting member, using a motor; and
   a control section configured to estimate a load applied to the vehicle height adjusting member, from a current supplied to the motor and a stroke correspondence quantity of the vehicle height adjusting member, and control the oil supplying portion based on the estimated load to adjust the height of the seat,
   wherein the control section estimates the load and adjusts the height of the seat based on the estimated load in a case where a vehicle velocity of the saddle-type vehicle is less than or equal to a first threshold and in a case where a state of the saddle-type vehicle is stable and the vehicle velocity is greater than or equal to a second threshold that is greater than the first threshold.

2. A vehicle height adjusting apparatus, comprising:
   a vehicle height adjusting member configured to adjust height of a seat of a saddle-type vehicle, using hydraulic pressure;
   an oil supplying portion configured to supply oil to the vehicle height adjusting member, using a motor; and
   a control section configured to estimate a load applied to the vehicle height adjusting member, from a current supplied to the motor and a stroke correspondence quantity of the vehicle height adjusting member, and control the oil supplying portion based on the estimated load to adjust the height of the seat,
   wherein the control section estimates the load based on a change amount of the stroke correspondence quantity occurring when the supplied current is changed by a prescribed amount.

3. The vehicle height adjusting apparatus according to claim 1, wherein the control section estimates the load based on a change amount of the supplied current occurring when the stroke correspondence quantity is changed by a prescribed amount.

4. The vehicle height adjusting apparatus according to claim 1, wherein the control section increases the stroke correspondence quantity as the estimated load becomes greater.

5. The vehicle height adjusting apparatus according to claim 1, wherein the saddle-type vehicle includes a stand and an engine, and
    wherein the control section estimates the load when the stand is raised and the engine is activated.

6. A vehicle height adjusting apparatus, comprising:
    a vehicle height adjusting member configured to adjust height of a seat of a saddle-type vehicle, using hydraulic pressure;
    an oil supplying portion configured to supply oil to the vehicle height adjusting member, using a motor; and
    a control section configured to estimate a load applied to the vehicle height adjusting member, from a current supplied to the motor and a stroke correspondence quantity of the vehicle height adjusting member, and control the oil supplying portion based on the estimated load to adjust the height of the seat,
    wherein the saddle-type vehicle includes a stand and an engine,
    wherein the control section estimates the load in a case where the stand is raised and the engine is activated, and
    wherein in a case where a vehicle velocity of the saddle-type vehicle is greater than a first threshold value, the control section estimates the load if a state in which a bank angle of the saddle-type vehicle is less than or equal to a prescribed value and acceleration of the saddle-type vehicle is less than or equal to a prescribed value continues for a prescribed time.

* * * * *